Oct. 22, 1968     P. E. WESEL ETAL     3,406,886
METHOD FOR CUTTING GLASS TUBING
Filed July 1, 1966

INVENTORS.
Peter E. Wesel
Anthony R. Zine, Jr.

William D. Fordick
AGENT 3,406,886
METHOD FOR CUTTING GLASS TUBING
Peter E. Wesel and Anthony R. Zine, Jr., Corning, N.Y., assignors to Corning Glass Works, Corning, N.Y., a corporation of New York
Filed July 1, 1966, Ser. No. 562,403
4 Claims. (Cl. 225—2)

ABSTRACT OF THE DISCLOSURE

A method for cutting glass tubing in which an external circumferential score line is formed on the tubing and heat is applied to the inner surface of the tubing opposite the score line. A small amount of a liquid is deposited in the score line prior to heating in order to increase the thermal gradient across the wall of the tubing.

---

This invention relates to methods for thermally severing glass tubing.

A common method for severing glass tubing involves the mechanical formation of a score line around the tubing and the use of heat to cause a thermal gradient across the wall of the tubing in an area along the score line to cause fracture of the tubing along the line. The score line is commonly formed on the inner surface of the tubing, and heat is applied to the exterior surface of the tubing opposite the score line by means of a gas-oxygen burner.

Due to the fact that the outer surface of tubing drawn from molten glass cools before the inner surface thereof, the outer surface is in compression, while the inner surface is in tension. Thus, when the inner surface is scored, there is a tendency for the tension in that surface to cause the score line to be propagated into the glass, thereby facilitating separation of the glass; however, there is, at the same time, a tendency for the tensile strain to cause internal cracks along the line of severance, which cracks may propagate into the body of the tubing long after its severance and cause weakening of the tubing. For this reason, there is an advantage in forming the score line in glass tubing in the outer surface, which surface is under compression. However, due to the fact that tensile strains are not present to assist in the separation of the glass, it is necessary that a very large thermal gradient be imposed across the wall of the tubing in order to effect thermal crack-off when an external score line is used in conjunction with externally applied heat. It is further necessary in such case to apply the heat rapidly and in a precisely localized region along the score line.

The present applicants have discovered that when heat is applied in the interior of a piece of glass tubing in the region of an external score line, the amount of heat required is less than when the heat is applied externally, and the precision with which the heat must be applied is not as great. Moreover, an extremely simple apparatus may be used to apply such heat internally.

Accordingly, it is an object of the present invention to provide a method for severing glass tubing which permits very simple and inexpensive apparatus to be used and which results in edges at the location of severance which are free from weakening cracks and other defects.

Figure 1:
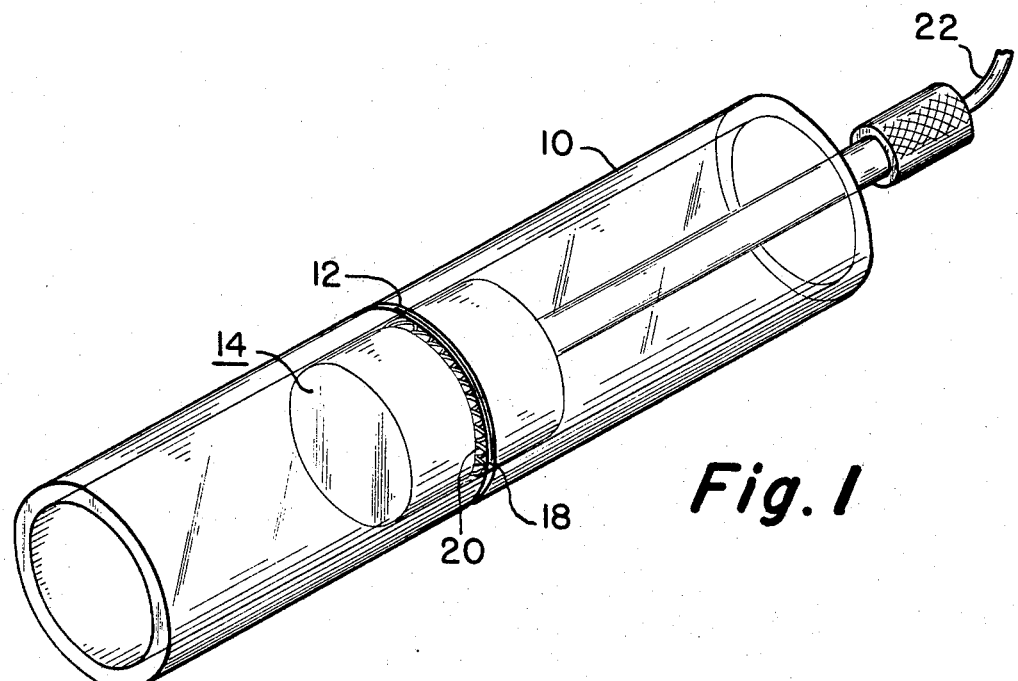
Figure 2:
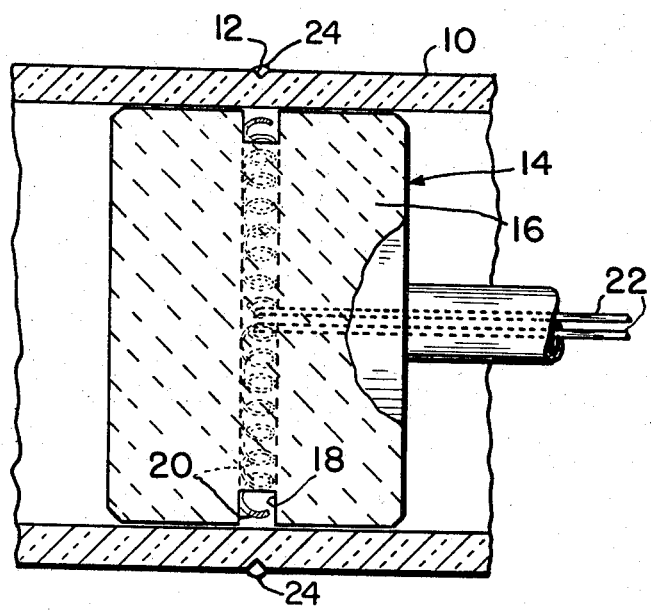

The invention will be described with reference to the accompanying drawing, in which:

FIGURE 1 is a perspective view of an externally scored section of glass tubing, showing the operation of the internal heating means, and FIGURE 2 is an axial sectional view of the apparatus and tubing of FIGURE 1.

Referring to the drawing, a section of glass tubing 10 is provided with a circumferential groove, or score line, 12. Score line 12 may be formed by any conventional means, such as a carbide wheel spring-loaded against the external surface of the tubing as relative rotation is effected between the tubing and wheel to cause the wheel to travel along the circumference of the tubing. The score line forms a circular path in a plane perpendicular to the axis of the tubing.

Heater 14, inserted within the interior of tubing 10, comprises a cylindrical electrically insulating ceramic member 16 having a circumferential groove 18 formed therein containing an electric resistance heating coil 20 extending completely around member 16 and spaced a short distance, for example, $\frac{1}{32}$ inch, from the inner surface of tubing 10. The groove is deeper than the thickness of coil 20, and coil 20 is wrapped tightly against the bottom of the groove to prevent contact between the coil and the inner surface of the tubing. Electric power is supplied to coil 20 through cord 22 by means not illustrated to heat the inner surface of the glass, thereby setting up a thermal gradient between the inner and outer surfaces of the tubing, which causes the tubing to crack along the score line.

In order to increase the thermal gradient, particularly with low-expansion glasses, a cold, wet sponge may be brought into contact with the outer surface of the tubing along the score line subsequent to heating to complete the fracture thereof. Preferably, however, a small amount of a liquid 24, such as glycerin, is deposited in the score line prior to heating. Other liquids having high boiling points, the ability to wet glass and high surface tensions may be used. When the glass is heated, the liquid in the score line boils. Due to the fact that the liquid extracts heat from the outer surface of the glass in the vicinity of the score line, the thermal gradient and the resultant stress across the tubing is increased. A liquid having a high boiling point, preferably above 500° F., is used so that the liquid will not boil away until the glass has been heated sufficiently to produce a large thermal gradient across glass. The liquid may be applied subsequent to the formation of the score line; however, it is preferably applied by the cutting wheel simultaneously with the formation of the score line. Heat is preferably applied to the tubing at the fastest feasible rate to maximize the resultant thermal gradient across the tubing wall.

The foregoing description has been provided solely as that of a preferred embodiment of the invention. Accordingly, the invention is not to be limited thereby, but only by the scope of the appended claims.

We claim:
1. A method for severing glass tubing which comprises the steps of
   forming a circumferential score line around said tubing in the outer surface thereof,
   maintaining a liquid in said score line, and
   applying heat to the inner surface of said tubing in the vicinity of said score line while said liquid is in said score line in an amount and at a rate sufficient to create a thermal gradient across the wall of said tubing to fracture said tubing along said score line.

2. The method according to claim 1 which includes the step of depositing in said score line a liquid having a boiling point above 500° F.

3. The method according to claim 1 which includes the step of maintaining within the interior of said tubing in the vicinity of said score line an annular electric resistance heating element.

4. The method according to claim 1 which includes the step of applying to the inner surface of said tubing sufficient heat to boil said liquid.

References Cited

UNITED STATES PATENTS

| | | | |
|---|---|---|---|
| 1,720,883 | 7/1929 | Campbell et al. | 225—93.5 |
| 2,282,440 | 5/1942 | Turke | 225—93.5 |
| 3,318,500 | 5/1967 | Swanson | 225—93.5 |

FOREIGN PATENTS

| | | |
|---|---|---|
| 331,411 | 7/1930 | Great Britain. |

JAMES M. MEISTER, *Primary Examiner.*